(12) United States Patent
Nagai

(10) Patent No.: US 11,706,522 B2
(45) Date of Patent: Jul. 18, 2023

(54) IMAGING SYSTEM, SERVER, IMAGING DEVICE, IMAGING METHOD, PROGRAM, AND RECORDING MEDIUM HAVING A FUNCTION OF ASSISTING CAPTURING OF AN IMAGE COINCIDENT WITH PREFERENCE OF A USER

(71) Applicant: FUJIFILM Corporation, Tokyo (JP)

(72) Inventor: Kazunari Nagai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 17/503,738

(22) Filed: Oct. 18, 2021

(65) Prior Publication Data
US 2022/0201196 A1    Jun. 23, 2022

(30) Foreign Application Priority Data
Dec. 17, 2020 (JP) .................. 2020-209319

(51) Int. Cl.
*H04N 23/60* (2023.01)
*H04N 5/262* (2006.01)
(Continued)

(52) U.S. Cl.
CPC ............ *H04N 23/64* (2023.01); *G06V 20/00* (2022.01); *H04N 5/2628* (2013.01);
(Continued)

(58) Field of Classification Search
CPC ........ H04N 5/23222; H04N 5/232411; H04N 5/232933; H04N 5/232939; H04N 5/2628; H04N 5/23206; H04N 23/64; H04N 23/631; H04N 23/633; H04N 23/651; H04N 23/661; G06V 20/00; G06V 10/764; G06V 20/35; G06V 40/103; G06V 40/161
See application file for complete search history.

(56) References Cited

U.S. PATENT DOCUMENTS 10,015,403 B2 *   7/2018   Kusaka ............... H04N 1/0097
2009/0162042 A1 * 6/2009   Wexler ............... H04N 5/23222
                                                    396/49
(Continued)

FOREIGN PATENT DOCUMENTS

JP    2009-187109 A    8/2009
WO    2017/047012 A1   3/2017

*Primary Examiner* — Luong T Nguyen
(74) *Attorney, Agent, or Firm* — Studebaker & Brackett PC (57) ABSTRACT

An image is analyzed, a scene of the image is recognized, imaging information regarding capturing in a case where the image is captured is acquired, and reproduction information in a case where the image is reproduced on a display is acquired. An image coincident with preference of a user of the imaging device from among images having the same scene is decided for each scene based on the reproduction information, and a preference parameter table in which the scene and imaging information of the imaging device in a case where the image coincident with the preference of the user is captured are stored in association with each other is created. Imaging information associated with a scene coincident with a scene of an image to be captured next by the user is selected from the preference parameter table, and an image is captured by using the imaging information.

25 Claims, 7 Drawing Sheets

(51) Int. Cl.
   *G06V 20/00* (2022.01)
   *H04N 23/63* (2023.01)
   *H04N 23/65* (2023.01)

(52) U.S. Cl.
   CPC ......... *H04N 23/631* (2023.01); *H04N 23/633* (2023.01); *H04N 23/651* (2023.01)

(56) References Cited

U.S. PATENT DOCUMENTS

| | | |
|---|---|---|
| 2009/0199226 A1 | 8/2009 | Suehiro et al. |
| 2018/0198988 A1 | 7/2018 | Suo |
| 2019/0156122 A1* | 5/2019 | Lu .................. G06K 9/6215 |
| 2019/0174056 A1* | 6/2019 | Jung ................ H04N 1/00244 |

* cited by examiner

IMAGING SYSTEM, SERVER, IMAGING DEVICE, IMAGING METHOD, PROGRAM, AND RECORDING MEDIUM HAVING A FUNCTION OF ASSISTING CAPTURING OF AN IMAGE COINCIDENT WITH PREFERENCE OF A USER

CROSS-REFERENCE TO RELATED APPLICATIONS

The present application claims priority under 35 U.S.C. § 119 to Japanese Patent Application No. 2020-209319 filed on Dec. 17, 2020. Each of the above application is hereby expressly incorporated by reference, in its entirety, into the present application.

BACKGROUND OF THE INVENTION

1. Field of the Invention

The present invention relates to an imaging system, a server, an imaging device, an imaging method, a program, and a recording medium having a function of assisting capturing of an image coincident with preference of a user.

2. Description of the Related Art

Since an image considered to be favorable by a user and an imaging method for capturing such an image are not linked, it may be difficult to capture an image coincident with preference of the user. Since there are a large number of imaging scenes and it is not possible to embody the image considered to be favorable by the user for each scene, it may not be possible to clearly grasp a high-quality image for the user.

Here, the related arts related to the present invention include, for example, JP2009-187109A and WO2017/047012A.

JP2009-187109A describes an image display apparatus that determines a degree of attention of a user for an image based on a display time or the number of times of display in a case where the image is displayed, detects an attention identifier indicating an attribute of an image from an attention image for which the degree of attention of the user is determined to be high, detects a display target image having the attention identifier from target images to be displayed on an image display unit, and executes display control such that a display frequency of the display target image becomes higher.

WO2017/047012A describes a system in which information to be used for discriminating an imaging scene is transmitted from an imaging apparatus to a server, the server extracts setting information corresponding to the imaging scene from setting information regarding setting for capturing stored in a storage unit based on the information to be used for discriminating the imaging scene and transmits the extracted setting information from the server to the imaging apparatus, and the imaging apparatus displays an icon for selecting the received setting information on a display unit.

SUMMARY OF THE INVENTION

As described above, JP2009-187109A describes that the degree of attention of the user for the image based on the display time or the number of times of display of the image is determined, and WO2017/047012A describes that the setting information corresponding to the imaging scene is transmitted to the imaging apparatus. However, JP2009-187109A and WO2017/047012A do not describe that an assistance for analyzing the image preference of the user for each imaging scene and capturing the image coincident with the image preference of the user is performed.

There is a rating function as the method for analyzing the image preference of the user. However, since a method for determining favorability of all images of all users and giving points is not used, obtained information is insufficient. It is considered that sensibilities such as the image preference of the user are unknowingly analyzed by the user, and there are preferences having a tendency that cannot be analyzed in the method of the related art in which the image preference is asked to the user.

Thus, in the method of the related art, the image preference of the user cannot be sufficiently analyzed, and thus, there is a problem that it is difficult to perform the assistance for capturing the image coincident with the preference of the user.

An object of the present invention is to provide an imaging system, a server, an imaging device, an imaging method, a program, and a recording medium capable of performing an assistance for capturing an image coincident with preference of a user for each scene.

In order to achieve the above object, the present invention provides an imaging system including an imaging device that captures images, and displays the images on a display, and a processor. The processor analyzes the images to recognize scenes of the images, acquires imaging information regarding the capturing in a case where the image is captured, acquires reproduction information in a case where the image is reproduced on the display, decides an image coincident with preference of a user of the imaging device based on the reproduction information, from among images having the same scene, for each scene, creates a preference parameter table in which the scene and imaging information in a case where the image coincident with the preference of the user is captured are stored in association with each other for each scene, selects imaging information associated with a scene coincident with a scene of an image to be captured next by the user from the preference parameter table, and captures an image by using the imaging information selected by the processor.

Here, it is preferable that the reproduction information includes a reproduction time in a case where the image is reproduced on the display of the imaging device and the processor decides an image of which the reproduction time is the longest as the image coincident with the preference of the user, from among the images having the same scene.

It is preferable that the reproduction information includes the number of times of reproduction in a case where the image is reproduced on the display of the imaging device and the processor decides an image for which the number of times of reproduction is the largest as the image coincident with the preference of the user, from among the images having the same scene.

It is preferable that the reproduction information includes a reproduction time and the number of times of reproduction in a case where the image is reproduced on the display of the imaging device and the processor decides the image coincident with the preference of the user based on a result obtained by weighting and adding the reproduction time and the number of times of reproduction, from among the images having the same scene.

It is preferable that the imaging information includes a set value regarding the capturing of the imaging device in a case where the image is captured and the processor sets the set value for the imaging device and captures an image by using the set value set by the processor.

It is preferable that the imaging information further includes operation information of the imaging device by the user in a case where the image is captured and the processor displays the operation information on the display of the imaging device.

It is preferable that the imaging device includes a camera, the camera includes the display, and the processor, and the processor of the camera displays operation information of the camera on the display of the camera.

It is preferable that the processor of the camera displays a message for causing the user to select whether or not to set the set value for the camera on the display of the camera.

It is preferable that the processor of the camera further displays the operation information of the camera on the display of the camera in a case where the user captures the next image.

It is preferable that the imaging device includes a camera having a communication function, and an information terminal having a communication function, the camera and the information terminal are able to be connected to each other by the communication functions, the information terminal includes the display and the processor, and the processor of the information terminal displays operation information of the camera on the display of the information terminal.

It is preferable that the processor of the information terminal displays a message for causing the user to select whether or not to set the set value for the camera on the display of the information terminal.

It is preferable that the processor of the information terminal displays the operation information of the camera on the display of the information terminal in a case where the user captures the next image.

It is preferable that the operation information includes information indicating whether an orientation of the camera is a portrait orientation or a landscape orientation in a case where the image is captured, information indicating an inclination of the camera from a horizontal state, and information indicating an on or off state of a member of the camera.

It is preferable that the processor automatically sets the set value for the imaging device without causing the user to select whether or not to set the set value for the imaging device.

It is preferable that the scene includes scenes of a plurality of different weather and the processor decides the image coincident with the preference of the user based on the reproduction information, from among images having the scenes of the same weather, for each scene of the weather.

It is preferable that the scene includes scenes in a plurality of different time slots and the processor decides the image coincident with the preference of the user based on the reproduction information, from among images having the scenes in the same time slot, for each scene in the time slot.

It is preferable that the scene includes scenes in which a subject moves in a plurality of different moving speed bands and the processor decides the image coincident with the preference of the user based on the reproduction information, from among images having the scenes in the same moving speed band, for each scene in the moving speed band.

It is preferable that the scene includes scenes of orientations of the image including a portrait orientation and a landscape orientation and the processor decides the image coincident with the preference of the user based on the reproduction information, from among images having the scenes in the same orientation of the image, for each scene in the orientation of the image.

It is preferable that the imaging system further includes a server connected to the imaging device via a network, in which the imaging device includes a first processor, the server includes a second processor, the first processor analyzes the images to recognize the scenes of the images, acquires the imaging information regarding the capturing in a case where the image is captured, acquires the reproduction information in a case where the image is reproduced on the display, and transmits the image, the scene, the imaging information, and the reproduction information to the server, the second processor receives the image, the scene, the imaging information, and the reproduction information from the imaging device, decides the image coincident with the preference of the user based on the reproduction information, from among the images having the same scene, for each scene, creates the preference parameter table in which the scene and the imaging information in a case where the image coincident with the preference of the user is captured are stored in association with each other for each scene, and transmits the preference parameter table to the imaging device, and the first processor further receives the preference parameter table from the server.

It is preferable that the imaging system further includes a server connected to the imaging device via a network, in which the imaging device includes a first processor, the server includes a second processor, the first processor acquires the imaging information regarding the capturing in a case where the image is captured, acquires the reproduction information in a case where the image is reproduced on the display, transmits the image, the imaging information, and the reproduction information to the server, the second processor receives the image, the imaging information, and the reproduction information from the imaging device, analyzes the image received by the second processor to recognize the scene of the image, decides the image coincident with the preference of the user based on the reproduction information, from among the images having the same scene, for each scene, creates the preference parameter table in which the scene and the imaging information in a case where the image coincident with the preference of the user is captured are stored in association with each other for each scene, and transmits the preference parameter table to the imaging device, and the first processor further receives the preference parameter table from the server.

It is preferable that the imaging device includes the display and the processor.

The present invention provides a server including a processor. The processor receives an image, a scene of the image, imaging information regarding capturing in a case where the image is captured, and reproduction information in a case where the image is reproduced in an imaging device from the imaging device, decides an image coincident with preference of a user of the imaging device based on the reproduction information, from among images having the same scene, for each scene, creates a preference parameter table in which the scene and the imaging information in a case where the image coincident with the preference of the user is captured are associated with each other for each scene, and transmits the preference parameter table to the imaging device.

The present invention provides an imaging device that captures images, and displays the images on a display, The device includes a processor. The processor analyzes the images to recognize scenes of the images, acquires imaging information regarding the capturing in a case where the image is captured, acquires reproduction information in a case where the image is reproduced on the display, transmits the image, the scene, the imaging information, and the reproduction information to a server, decides an image coincident with preference of a user of the imaging device based on the reproduction information, from among images having the same scene, for each scene, and receives a preference parameter table created such that the scene and imaging information in a case where the image coincident with the preference of the user is captured are associated with each other from the server, selects imaging information associated with a scene coincident with a scene of an image to be captured next by the user from the preference parameter table, and captures an image by using the imaging information selected by the processor.

The present invention provides an imaging method including a step of analyzing, by a scene recognition unit, images captured by an imaging unit of the imaging device to recognize scenes of the images, a step of acquiring, by an imaging information acquisition unit, imaging information regarding the capturing in a case where the image is captured, a step of acquiring, by a reproduction information acquisition unit, reproduction information in a case where the image is reproduced on a display of the imaging device, a step of deciding, by an image decision unit, an image coincident with preference of a user of the imaging device based on the reproduction information, from among images having the same scene, for each scene, a step of creating, by a table creation unit, a preference parameter table in which the scene and imaging information in a case where the image coincident with the preference of the user is captured are stored in association with each other for each scene, a step of selecting, by an imaging information selection unit, imaging information associated with a scene coincident with a scene of an image to be captured next by the user from the preference parameter table, and a step of capturing, by the imaging unit, an image by using the imaging information selected in the step of selecting the imaging information.

The present invention provides a program causing a computer to execute the steps of the imaging method.

The present invention provides a computer-readable recording medium having a program causing a computer to execute the steps of the imaging method recorded thereon.

According to the present invention, the assistance for deciding the image coincident with the image preference of the user for each scene of the image based on the reproduction information of the image and capturing an image by using the imaging information in a case where the image of the scene coincident with the image preference of the user is captured in the past is performed. Accordingly, since the user can capture the image of the scene coincident with the image preference of the user just by capturing the image as usual, the user can capture a high-quality image.

DESCRIPTION OF THE PREFERRED EMBODIMENTS

Hereinafter, an imaging system, a server, an imaging device, an imaging method, a program, and a recording medium according to an embodiment of the present invention will be described in detail based on preferred embodiments shown in the accompanying drawings.

Figure 1:
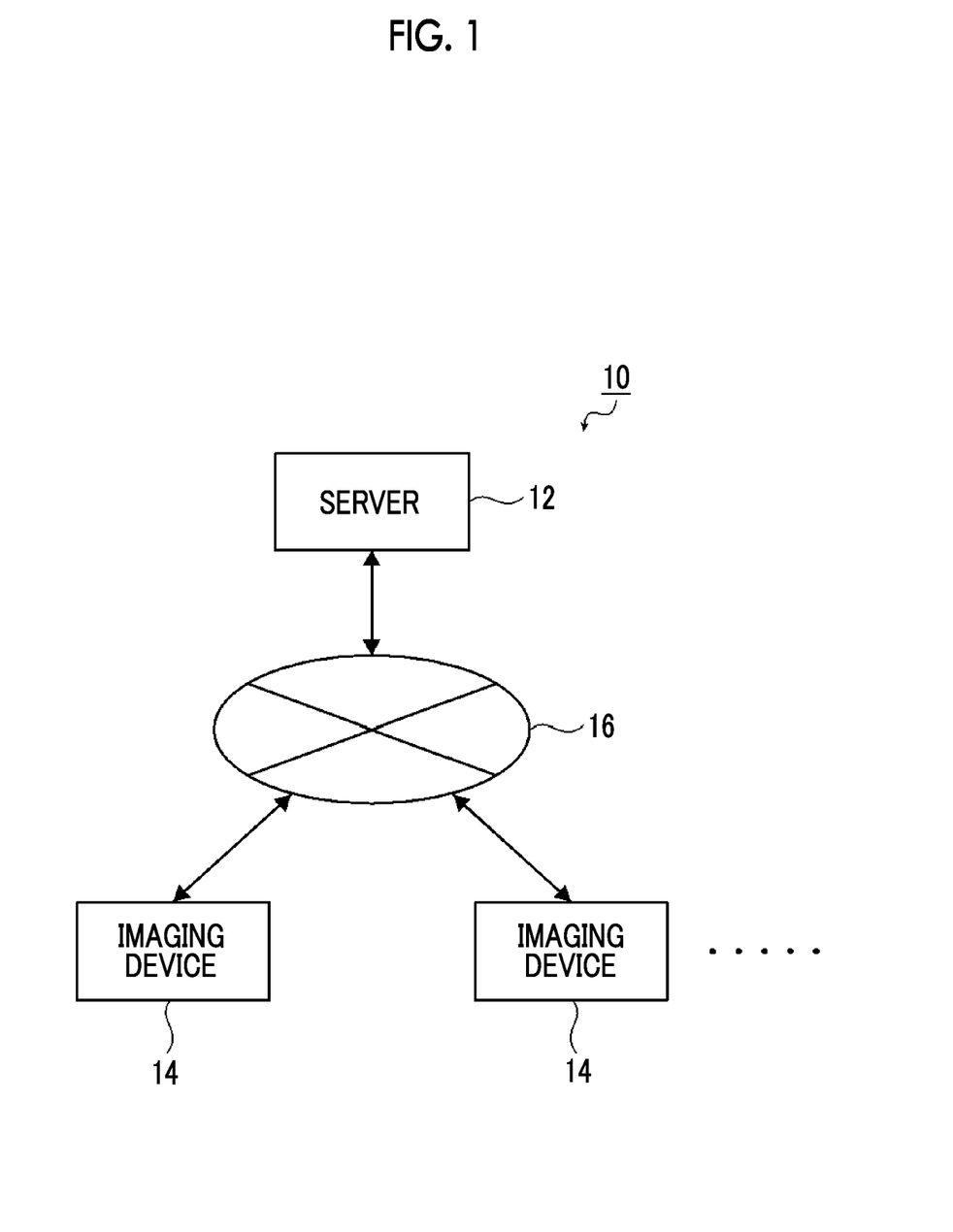
FIG. 1 is a block diagram of an embodiment showing a configuration of an imaging system according to an embodiment of the present invention.

FIG. 1 is a block diagram of an embodiment showing a configuration of the imaging system according to the embodiment of the present invention. An imaging system 10 shown in FIG. 1 includes a plurality of imaging devices 14 of a plurality of users and a server 12. The server 12 and each of the plurality of imaging devices 14 are connected to each other via a network 16 such as the Internet, a telephone line, and Wireless Fidelity (Wi-Fi). Accordingly, the server 12 and each imaging device 14 can transmit and receive data to and from each other.

Figure 2:
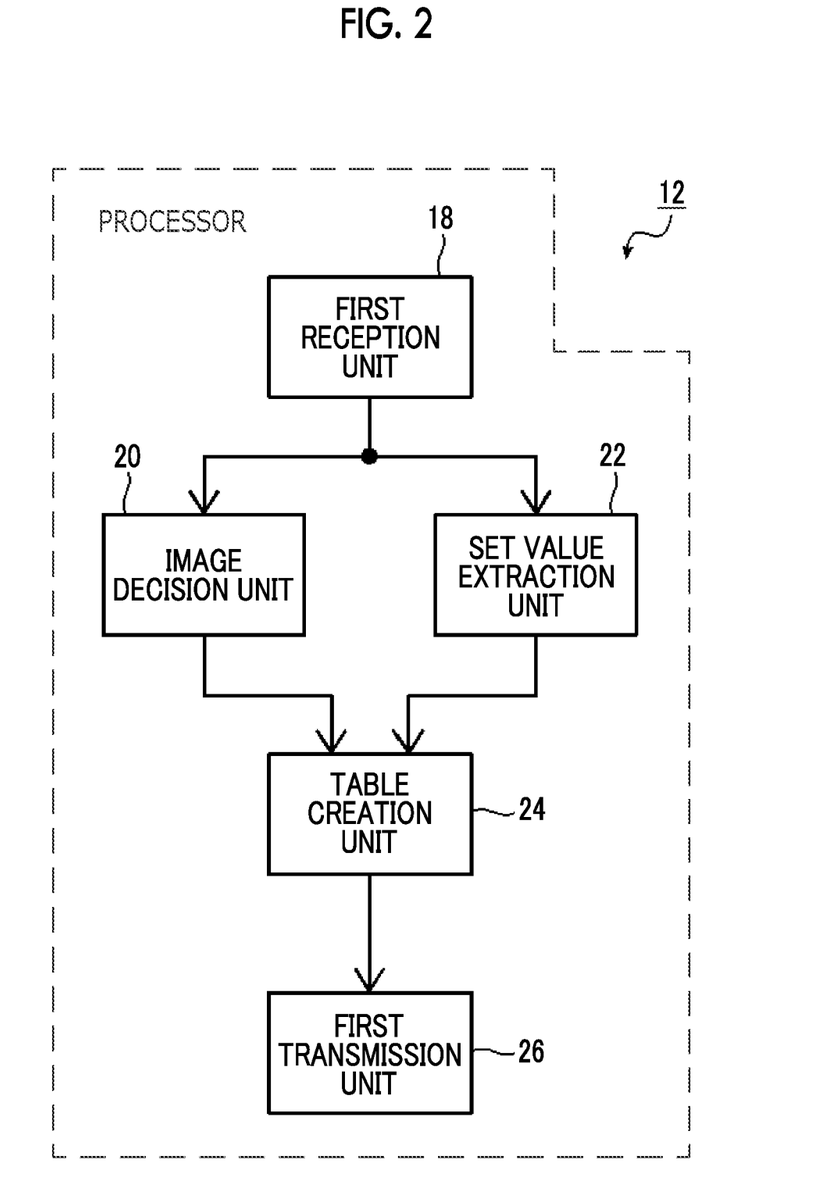
FIG. 2 is a block diagram of an embodiment showing a configuration of a server.

The server 12 receives an image, a scene of the image associated with the image, a set value of the imaging device 14, and reproduction information of the image from the imaging device 14 for each image, creates a preference parameter table based on these pieces of information, and transmits this preference parameter table to the imaging device 14. As shown in FIG. 2, the server 12 includes a first reception unit 18, an image decision unit 20, a set value extraction unit 22, a table creation unit 24, and a first transmission unit 26.

The first reception unit 18 receives various kinds of data from the imaging device 14. For example, the first reception unit 18 receives an image, a scene of an image associated with the image, a set value of the imaging device 14, and reproduction information of the image from the imaging device 14 for each image. In the case of the present embodiment, the set value of the imaging device 14 is received in a state of being included in header information such as exchangeable image file format (Exif) of the image.

The set value of the imaging device 14 includes values (imaging condition) of various setting items regarding the capturing of the imaging device 14 in a case where the image is captured, and is not particularly limited. However, for example, the set value includes at least one value of a shutter speed, a focal length, or an ISO sensitivity in addition to an F value (F number) of the imaging device 14, an exposure correction value, a film simulation set value, a white balance set value, a dynamic range set value, and the like in a case where the image is captured, as values of setting items that affect image quality, such as blurriness, tint, and texture. The set value may include values of other setting items. The set value of the imaging device 14 can be extracted from the header information of the image.

The reproduction information of the image is information regarding reproduction in a case where the image is reproduced on a display unit of the imaging device 14, and includes a reproduction time and the number of times of reproduction of the image.

The image decision unit 20 decides one image coincident with the preference of the user of the imaging device 14 based on the reproduction information of the image for each scene of the image, from among the images having the same scene.

The image preference of the user represents a tendency of an image that the user prefers to capture or reproduce. Thus, for example, an image of which a reproduction time is long or an image for which the number of times of reproduction is large can be considered to be an image coincident with the preference of the user. In the case of the present embodiment, the image decision unit 20 decides an image of which the reproduction time is the longest as the image coincident with the preference of the user, from among the images having the same scene.

The set value extraction unit 22 extracts the set value of the imaging device 14 from the header information of the image received by the first reception unit 18.

The table creation unit 24 creates the preference parameter table in which the scene of the image and the set value of the imaging device 14 in a case where the image coincident with the preference of the user is captured are stored in association with each other for each scene of the image. That is, the scene of the image and a set value of a camera 28 in a case where the image coincident with the preference of the user, in other words, the image of which the reproduction time is the longest is captured among the images having the same scene as this scene are stored in association with each other for each scene of the image in the preference parameter table.

The first transmission unit 26 transmits various kinds of data to the imaging device 14. For example, the first transmission unit 26 transmits the preference parameter table to the imaging device 14.

Figure 3:
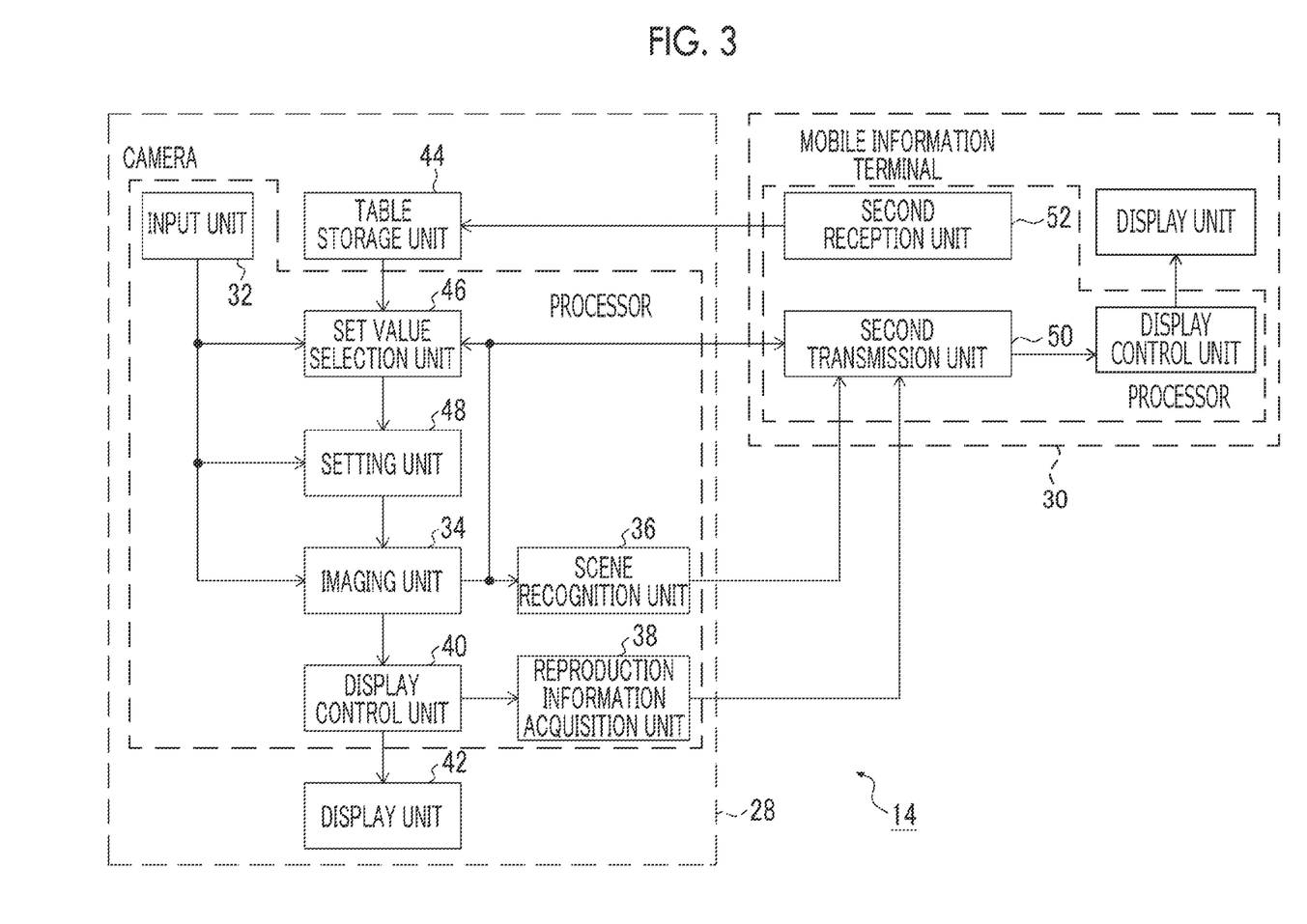
FIG. 3 is a block diagram of an embodiment showing a configuration of an imaging device.

The imaging device 14 transmits the image, the scene of the image associated with the image, the set value of the imaging device 14, and the reproduction information of the image to the server 12 for each image, and receives the preference parameter table from the server 12. In a case where the user captures an image, the imaging device 14 selects a set value associated with a scene coincident with a scene of an image to be captured next by the user from the preference parameter table, and captures the image by using this set value.

In the case of the present embodiment, the imaging device 14 includes the camera 28 having a communication function and a mobile information terminal 30 having a communication function. The camera 28 is a digital camera or the like, and as shown in a left part of FIG. 3, includes an input unit 32, an imaging unit 34, a scene recognition unit 36, a reproduction information acquisition unit 38, a display control unit 40, a display unit 42, a table storage unit 44, a set value selection unit 46, and a setting unit 48. The mobile information terminal 30 is a smartphone or the like, and includes a second transmission unit 50 and a second reception unit 52 as shown in a right part of FIG. 3.

The camera 28 and the mobile information terminal 30 also comprise components other than the above components, but the description will be omitted here.

The camera 28 and the mobile information terminal 30 can be connected to each other in a wired manner using, for example, a Universal Serial Bus (USB) cable or the like in a wireless manner by Bluetooth (registered trademark), Wi-Fi, or the like, and can transmit and receive data to and from each other by a mutual communication function. The communication functions of the camera 28 and the mobile information terminal 30 include a transmission function by a known transmission unit and a reception function by a reception unit. The detailed description of the connection between the camera 28 and the mobile information terminal 30 and the transmission and reception of data will be omitted.

In the camera 28, the imaging unit 34 captures an image in a case where a shutter button is pressed by the user. For example, the imaging unit 34 captures an image by using the set value of the camera 28 selected from the preference parameter table.

The input unit 32 acquires various instructions and the like input from the user of the imaging device 14. The input unit 32 is not particularly limited, but acquires various instructions and the like input from the user by a touch operation by using a touch panel provided in a display unit 42 on an operation screen displayed on the display unit 42, in addition to various instructions input from the user by using various physical members of the imaging device 14, such as half pushing or full pushing of the shutter button of the camera 28 and a switch for controlling on or off of various sensors.

For example, the input unit 32 acquires an instruction of whether or not to capture an image by using the set value of the camera 28 selected from the preference parameter table in addition to an imaging instruction, an image browsing instruction, and an image transmission instruction, and the like.

The display control unit 40 causes the display unit 42 to display various kinds of information in response to an instruction from the user or the like. For example, the display control unit 40 causes the display unit 42 to display an image captured by the imaging unit 34, various operation screens, and the like.

The display unit 42 is a display that displays various kinds of information under the control of the display control unit 40. The display unit 42 is not particularly limited, and is, for example, an image display apparatus such as a liquid crystal display and an organic electro luminescence (EL) display.

The scene recognition unit 36 analyzes an image for one or more analysis items for each image captured by the imaging unit 34 to recognize a scene of this image, for example, a scene of a sports meeting, a scene of an indoor, or a scene of an outdoor.

The analysis item is not particularly limited, and may include analysis of image quality of an image such as brightness, hue (chroma saturation), sharpness, contrast, and a degree of blurriness of the image.

The analysis item may include analysis of contents of an image, such as detection of subjects (persons and objects other than persons) appearing in an image, detection of the number of persons, detection of a face of a person, detection of a facial expression of a person, detection of an action of a person, and detection of weather.

The analysis item may include analysis of attributes of an image, such as an imaging date and time and an imaging location included in the header information of the image.

The scene recognition unit 36 may recognize the scene of the image by analyzing one or more analysis items by image analysis, or may estimate the scene of the image by using a determination model.

Here, the determination model is a trained model in which a learning image and a scene of this learning image are used as pieces of training data and a relationship between the learning image and the scene of the learning image is trained for a plurality of pieces of training data.

The determination model receives the image as an input and estimates the scene of the image.

The reproduction information acquisition unit 38 acquires the reproduction information in a case where the image is reproduced on the display unit of the camera 28, that is, the reproduction time and the number of times of reproduction of the image for each image. More specifically, the reproduction information acquisition unit 38 retains, as the reproduction information, log data obtained by counting the reproduction time and the number of times of reproduction of the image for each image in the camera 28. The reproduction information acquisition unit 38 can acquire the reproduction information from the display control unit 40 in a case where the image is displayed on the display unit of the camera 28 under the control of the display control unit 40.

The table storage unit 44 is a memory that stores the preference parameter table received from the server 12 by the second reception unit 52 of the mobile information terminal 30 and further received from the mobile information terminal 30 by the communication function. The table storage unit 44 is not particularly limited, and is a semiconductor memory, a storage device such as a hard disk drive (HDD) and a solid state drive (SSD), and the like.

In a case where the user captures an image, the set value selection unit 46 selects the set value of the camera 28 associated with a scene coincident with a scene of an image to be captured next by the user from the preference parameter table stored in the table storage unit 44.

The setting unit 48 sets the set value selected by the set value selection unit 46 for the camera 28.

In the mobile information terminal 30, the second transmission unit 50 transmits various kinds of data to the server 12. For example, the second transmission unit 50 transmits the image, the scene of the image associated with the image, the set value of the camera 28, and the reproduction information of the image to the server 12.

The second reception unit 52 receives various kinds of data from the server 12. For example, the second reception unit 52 of the imaging device 14 receives the preference parameter table from the server 12.

Instead of the mobile information terminal 30, an information terminal such as a desktop personal computer (PC), a notebook PC, or a tablet PC having a communication function may be used.

Figure 4:
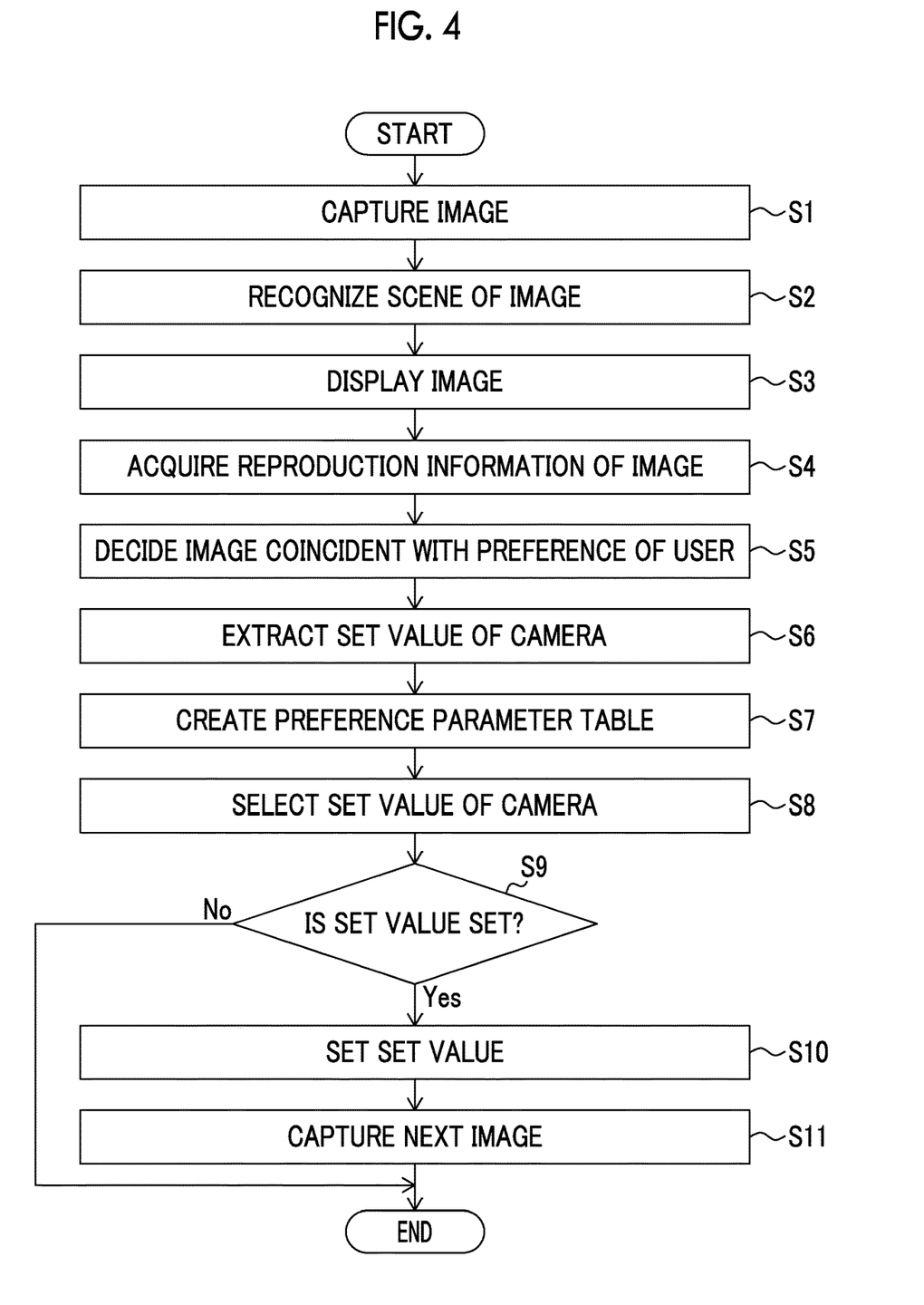
FIG. 4 is a flowchart of an embodiment showing an operation of the imaging system.

Next, an operation of the imaging system will be described with reference to the flowchart shown in FIG. 4.

First, in the imaging device 14, the user captures an image by using the camera 28. In this case, in a case where the user presses the shutter button of the camera 28, the input unit 32 acquires the imaging instruction by the shutter button, and the imaging unit 34 captures the image in response to this instruction (step S1). The set value of the camera 28 in a case where this image is captured is stored in the header information of this image.

Figure 6:
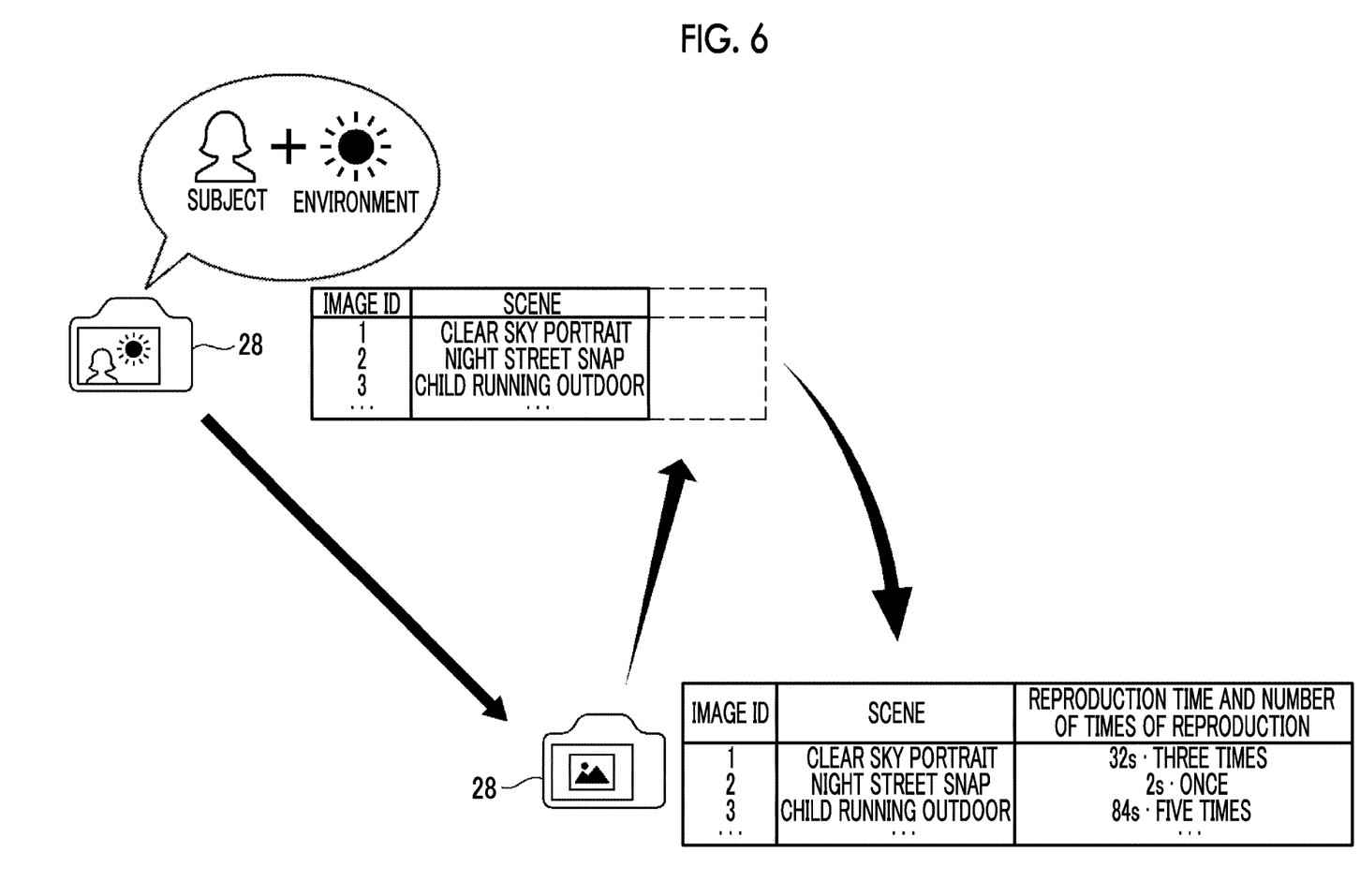
FIG. 6 is a conceptual diagram of an embodiment showing a flow of an operation of the imaging system in a case where an image, a scene, and reproduction information are associated with each other.

As shown in an upper left part of FIG. 6, whenever the image is captured by the imaging unit 34, the image is analyzed by the scene recognition unit 36, and the scene of the image is recognized based on a subject appearing in the image and an imaging environment such as weather, an imaging date and time, and an imaging position (step S2). As shown in a central part of FIG. 6, an image represented by an image identification (ID) and a scene of this image are associated with each other.

Figure 5:
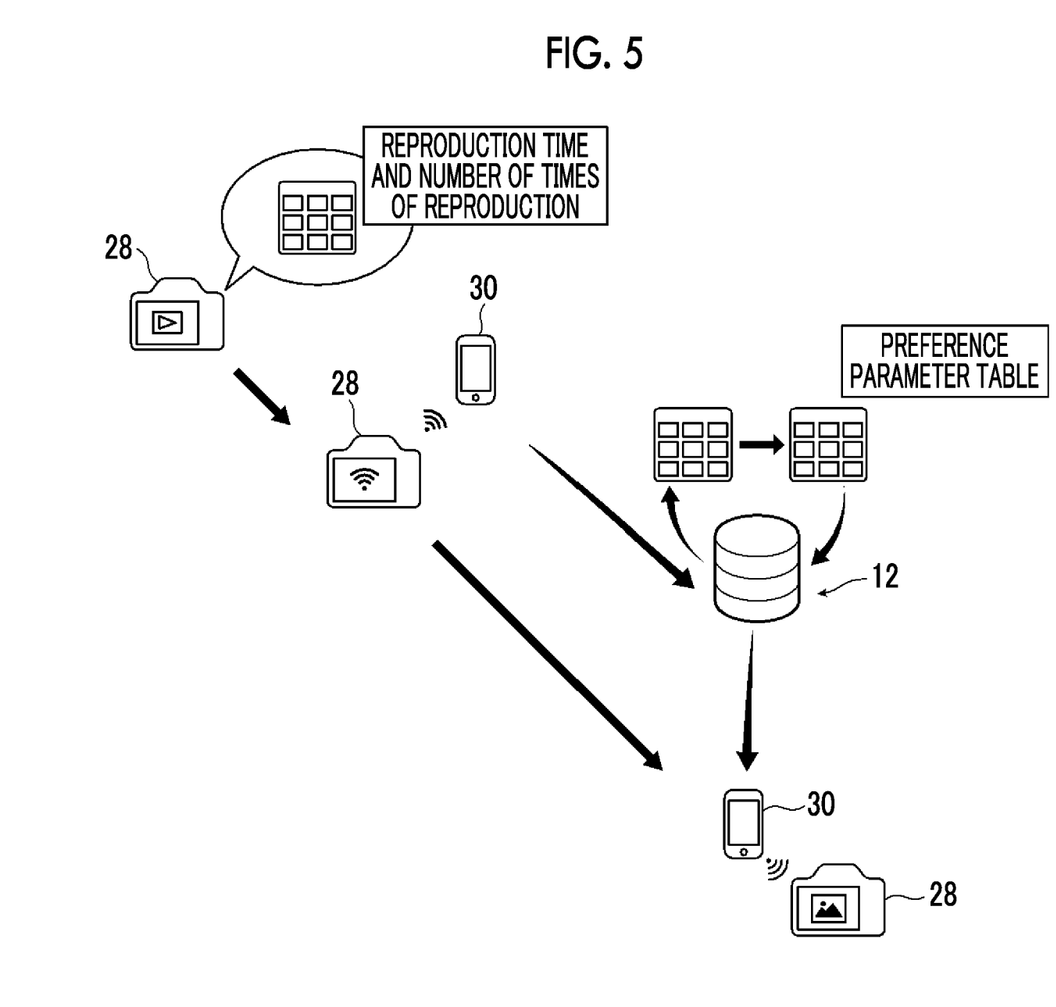
FIG. 5 is a conceptual diagram of an embodiment showing a flow of the entire operation of the imaging system.

After the capturing is ended, as shown in an upper left part of FIG. 5 and a lower part of FIG. 6, the user displays and browses the image captured by the imaging unit 34 on the display unit of the camera 28 (step S3). In this case, in a case where the user inputs an instruction to designate an image wanted to be browsed, the input unit 32 acquires the instruction to browse this image, and the image designated by the user is displayed on the display unit 42 of the camera 28 under the control of the display control unit 40 in response to this instruction.

Whenever the image is displayed on the display unit 42, the reproduction information acquisition unit 38 acquires the reproduction time and the number of times of reproduction of the image as the reproduction information in a case where the image is reproduced on the display unit 42 of the camera 28 (step S4). As shown in the lower part of FIG. 6, the image represented by the above-mentioned image ID, the scene of this image, and the reproduction time and the number of times of reproduction of the image as the reproduction information of this image are associated with each other.

Subsequently, as shown in a central part of FIG. 5, the user connects the camera 28 and the mobile information terminal 30, and transmits the image from the camera 28 to the mobile information terminal 30. In this case, in a case where the user instructs to transmit the image, the input unit 32 acquires the instruction to transmit this image, and in response to this instruction, the scene of the image associated with this image and the reproduction information of the image in addition to the image is transmitted from the camera 28 to the mobile information terminal 30 by the communication function.

Subsequently, as shown in a right central part of FIG. 5, the image received from the camera 28 by the communication function, the scene of the image associated with this image, and the reproduction information of the image are transmitted to the server 12 from the mobile information terminal 30 by the second transmission unit 50 of the mobile information terminal 30.

Subsequently, in the server 12, the first reception unit 18 receives the image, the scene of the image associated with the image, and the reproduction information of the image from the imaging device 14. The set value of the camera 28 is acquired in a state of being included in the header information of the image.

Subsequently, the image decision unit 20 decides the image coincident with the preference of the user of the imaging device 14 based on the reproduction information of these images, from among the images having the same scene, for each scene of the image received by the first reception unit 18. In the case of the present embodiment, the image decision unit decides the image of which the reproduction time is the longest as the image coincident with the preference of the user, from among the images having the same scene, for each scene of the image (step S5).

Subsequently, as shown in a central part of FIG. 7, the set value extraction unit 22 extracts the set value of the camera 28 from the header information of the image decided by the image decision unit 20 for each scene of the image (step S6). For example, set values A, B, C, . . . of the camera 28 are extracted for a scene A of the image. The same applies to the scenes B, C, . . . of the image.

Subsequently, as shown in the lower part of FIG. 7, the table creation unit 24 creates the preference parameter table in which the scene of the image and the set value of the camera 28 in a case where the image coincident with the preference of the user is captured are stored in association with each other for each scene of the image scene (step S7).

Subsequently, as shown in a lower right part of FIG. 5, the first transmission unit 26 transmits the preference parameter table created by the table creation unit 24 to the imaging device 14.

Figure 7:
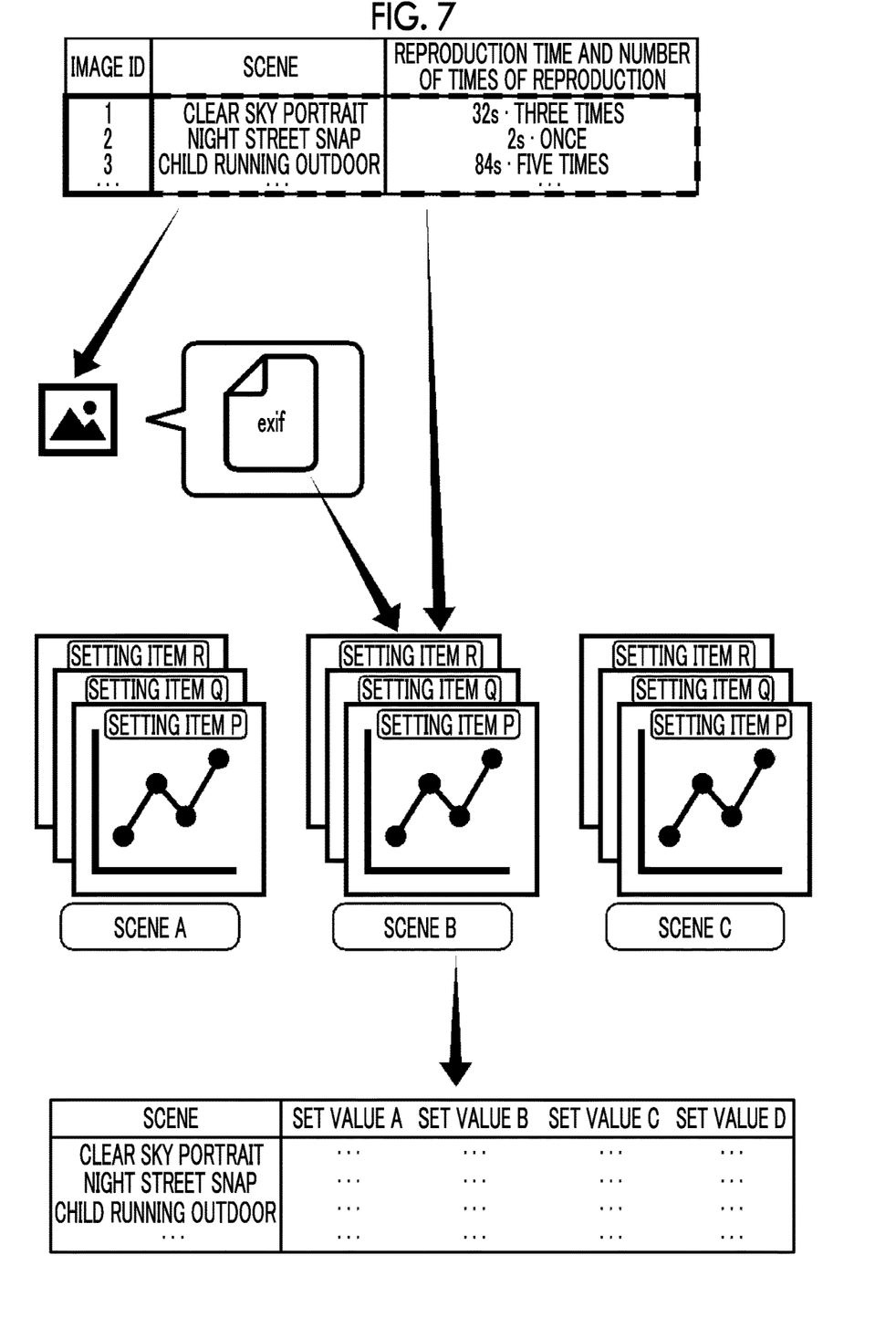
FIG. 7 is a conceptual diagram of an embodiment showing an operation of the imaging system in a case where a preference parameter table is created.

For example, as shown in the central part of FIG. 7, a line graph representing a relationship between the reproduction time and the set value is generated for each scene and for each setting item. The graph is not limited to the line graph, but may be a bar graph or the like. In each graph, a vertical axis represents the reproduction time of the image, for example, the reproduction information of the image in the case of the present embodiment, and a horizontal axis represents the value of the setting item of the camera 28, that is, the set value of the camera 28. For example, in a case where the setting item is the F value, the set value of the camera 28 is a discontinuous value from 1.4 to 32.

For example, in the case of a setting item P of the image of the scene A, a graph of the setting item P of the image of the scene A is generated based on the reproduction time of the image of the scene A and the set value of the camera 28 extracted from the header information of the image of the scene A. In the graph of the image setting item P of the scene A, the set value with which the reproduction time of the image is the longest is the set value of the camera 28 of the image of the scene A. The same applies to other setting items Q and R of the scene A and the setting items P, Q, and R of the images having the other scenes B and C.

Here, the values of the setting items P, Q, and R of the camera 28 may be changed independently of each other or may be changed in relation to each other. For example, the ISO sensitivity and the shutter speed may be changed independently of each other, or may be changed in inverse proportion to each other. Accordingly, setting items that are not directly related to the image quality, such the ISO sensitivity and the shutter speed, are excluded, and it is desirable to use setting items that are directly related to the image quality and may be changed independently of each other as the setting items of the camera 28.

As in the case of the present embodiment, in the server 12, the set value extraction unit 22 of the server 12 may extract the set value of the camera 28 from the header information of the image for each scene of the image. Alternatively, in the imaging device 14, a set value extraction unit is provided, and the set value extraction unit of the imaging device 14 may extract the set value of the camera 28 from the header information of the image, and the set value may be transmitted to the server 12 from the imaging device 14.

Subsequently, in the imaging device 14, the preference parameter table is received from the server 12 by the second reception unit 52 of the mobile information terminal 30.

Subsequently, as shown in the lower right part of FIG. 5, the preference parameter table received by the second reception unit 52 is transmitted to the camera 28 from the mobile information terminal 30 by the communication function, and is stored in the table storage unit 44 of the camera 28.

An operation from the capturing of the image described above to the storage of the preference parameter table is performed whenever the image, the scene of the image associated with this image, and the reproduction information of the image are transmitted from the imaging device 14 to the server 12.

Thus, as the number of images having the same scene transmitted from the imaging device 14 to the server 12 increases, the number of images having the same scene received from the imaging device 14 gradually increases in the server 12. In a case where the reproduction times of the images having the same scene become longer or the number of times of reproduction increases in the camera 28, the reproduction times of the images having the same scene are counted in the server 12 and gradually become longer or the number of times of reproduction is counted and gradually increases.

The image, the scene of the image, and the reproduction information of the image may be recorded for a regular period, for example, one day, and the recorded image, the scene of the image, and the reproduction information of the image may be transmitted from the imaging device 14 to the server 12 for each regular period.

Subsequently, the user captures the next image. In this case, in a case where the user inputs a scene coincident with a scene of an image to be captured next, the input unit 32 acquires an instruction of the scene of the image. Alternatively, in a case where the user points the camera 28 at a subject to be captured next, the imaging unit 34 captures a live preview image of the subject, and the scene recognition unit 36 recognizes the scene of the live preview image.

In response to this recognition, the set value selection unit 46 selects the set value of the camera 28 associated with the scene coincident with the scene of the image to be captured next by the user from the preference parameter table stored in the table storage unit 44 (step S8).

Subsequently, the set value of the camera 28 selected by the set value selection unit 46 and a message for causing the user to select whether or not to set this set value for the camera 28, for example, "do you want to perform this setting? Yes/No" are displayed on the display unit 42 under the control of the display control unit 40 (step S9).

Accordingly, since the user can confirm the set value of the camera 28 in a case where the image of the scene coincident with the preference of the user is captured on the display unit 42 of the camera 28, the user can determine whether or not to set an appropriate set value for the camera 28 without hesitation.

Here, in a case where the user selects "No" (No in step S9), the processing is ended. In this case, the user can execute the above operation again, for example, by changing the scene of the image.

On the other hand, in a case where the user selects "Yes" (Yes in step S9), the set value of the camera 28 selected by the set value selection unit 46 is set for the camera 28 by the setting unit 48 (step S10).

The setting unit 48 may automatically set the set value for the camera 28 without causing the user to select whether or not to set the set value for the camera 28.

Accordingly, the user can capture the image as the user wants to capture without any operation.

After the setting of the set values is completed, a message such as "setting is completed" is displayed on the display unit 42 under the control of the display control unit 40.

In response to this display, the user captures the next image by using the camera 28 for which the set value is set by the setting unit 48 (step S11).

In the imaging system 10, an assistance for deciding an image coincident with the image preference of the user for each scene of the image based on the reproduction information of the image and capturing an image by using the set value of the camera 28 in a case where the image of the scene coincident with the image preference of the user is captured in the past is performed. Accordingly, since the user can capture the image of the scene coincident with the image preference of the user just by capturing the image as usual, the user can capture a high-quality image.

The scene of the image is not particularly limited, but may include scenes of a plurality of different weather, for example, scenes of sunny, cloudy, rainy, and snowy.

In this case, the image decision unit 20 decides the image coincident with the preference of the user based on the reproduction information, from among the images having the same weather scene, for each scene of the weather.

For example, in the sunny scene, the image of which the reproduction time is the longest from among the images captured by a certain subject is decided to be the image coincident with the preference of the user, and the preference parameter table in which the sunny scene and the white balance set value in a case where the image coincident with the preference of the user is captured are stored in association with each other is created.

In a case where the user captures an image of a certain subject in the sunny scene, the white balance set value associated with the sunny scene is selected from the preference parameter table, and the white balance set value is automatically set by the camera 28.

The same applies to scenes with other weather than the sunny scene.

Accordingly, the user can capture the image coincident with the preference of the user in various weather scenes.

The scene of the image may include scenes in a plurality of different time slots, such as morning, day, and night scenes.

In this case, the image decision unit 20 decides the image coincident with the preference of the user based on the reproduction information, from among the images of the scenes in the same time slot, for each scene in the time slot.

For example, in the morning scene, the image of which the reproduction time is the longest from among the images captured by a certain subject is decided to be the image coincident with the preference of the user, and the preference parameter table in which the morning scene and the white balance set value in a case where the image coincident with the preference of the user is captured are stored in association with each other is created.

In a case where the user captures the image of a certain subject in the morning scene, the white balance set value associated with the morning scene is selected from the preference parameter table, and the white balance set value is automatically set by the camera 28.

The same applies to scenes in other time slots other than the morning scene.

Accordingly, the user can capture the image coincident with the preference of the user in the scenes of various time slots.

The scene of the image may include scenes in which the subject moves in a plurality of different moving speed bands, for example, scenes in a stationary state, a low speed band, an intermediate speed band, and a high speed band.

In this case, the image decision unit 20 decides the image coincident with the preference of the user based on the reproduction information, from among the images of the scenes in the same moving speed band, for each scene in the moving speed band.

For example, in the scene in the intermediate speed band, the image of which the reproduction time is the longest from among the images captured by a certain subject is decided to be the image coincident with the preference of the user, and the preference parameter table in which the scene in the intermediate speed band and the set value of the shutter speed in a case where the image coincident with the preference of the user is captured are stored in association with each other is created.

In a case where the user captures an image of a certain subject in the scene in the intermediate speed band, the set value of the shutter speed associated with the scene in the intermediate speed band is selected from the preference parameter table, and the set value of the shutter speed is automatically set for the camera 28.

The same applies to scenes in the moving speed bands other than the scenes in the intermediate speed band.

Accordingly, the user can capture the image coincident with the preference of the user in the scenes of various moving speeds of the subject.

The scene of the image may include a scene of an orientation of an image including a portrait orientation or a landscape orientation.

In this case, the image decision unit 20 decides the image coincident with the preference of the user based on the reproduction information, from among the images of the scenes having the same image orientation, for each scene having the same image orientation.

For example, in the portrait scene, the image of which the reproduction time is the longest from among images on which buildings are captured is decided to be the image coincident with the preference of the user, and the preference parameter table in which the portrait scene and the set value in a case where the image coincident with the preference of the user is captured are stored in association with each other is created.

In a case where the user captures the image of the building in the portrait scene, the set value associated with the portrait scene is selected from the preference parameter table, and this set value is displayed as a recommended set value on the display unit of the camera 28.

The same applies to the landscape scenes.

Accordingly, the user can confirm the set value of the camera 28 in a case where the image having the orientation coincident with the preference of the user is captured in the camera 28, and can recognize the image preference of the user. Thus, there are more opportunities to capture the images coincident with the preference of the user.

The image decision unit 20 may decide the image for which the number of times of reproduction is the largest as the image coincident with the preference of the user, from among the images having the same scene. Alternatively, the image decision unit 20 may decide the image coincident with the preference of the user based on the result of weighting and adding the reproduction time and the number of times of reproduction, from among the images having the same scene. For example, the image for which a value of the result of weighting and adding the reproduction time and the number of times of reproduction is the largest is decided to be the image coincident with the preference of the user. In this case, the weights for the reproduction time and the number of times of reproduction can be set optionally.

An operation information acquisition unit and an operation information selection unit may be provided, the operation information acquisition unit may acquire operation information of the imaging device 14, and the operation information selection unit may select the operation information of the imaging device 14 by the user in a case where the image is captured from the preference parameter table.

The operation information of the imaging device 14 is information regarding the operation of the camera 28 by the user in a case where the image is captured, and includes the touch operation of the user and the like performed by using the touch panel provided in the display unit on the operation screen displayed on the display unit of the camera 28 in addition to the operation of the user performed on various physical members of the camera 28 such as the shutter button and the sensor. For example, the operation information includes information on the rotation of the camera 28 in a case where the image is captured, that is, information indicating whether the camera 28 is in the portrait orientation or the landscape orientation, information indicating an inclination of the camera 28 from a horizontal state, and information indicating an on or off state of a member of the camera 28.

The set value of the camera 28 and the operation information of the camera 28 constitute imaging information according to the embodiment of the present invention. The imaging information is information regarding the capturing of the imaging device 14 in a case where the image is captured by the imaging device 14. The set value extraction unit 22 and the operation information acquisition unit constitute an imaging information acquisition unit according to the present invention. The imaging information acquisition unit acquires the imaging information regarding the capturing in a case where the image is captured. The set value selection unit 46 and the operation information selection unit constitute the imaging information selection unit according to the present invention. The imaging information selection unit selects the imaging information associated with the scene coincident with the scene of the image to be captured next by the user from the preference parameter table.

In this case, the image represented by the above-mentioned image ID, the scene of this image, the reproduction information of the image, and the imaging information including the set value of the camera 28 and the operation information of the camera 28 are associated with each other.

Subsequently, the table creation unit 24 creates the preference parameter table in which the scene of the image, the imaging information of the camera 28 in a case where the image coincident with the preference of the user of this scene is captured are stored in association with each other for each scene of the image.

The imaging information selection unit selects the imaging information of the camera 28 associated with the scene coincident with the scene of the image to be captured next by the user from the preference parameter table stored in the table storage unit 44.

Of the imaging information selected by the set value selection unit 46, in a case where the user captures the image after the setting of the set value of the camera 28 is completed, the operation information of the camera 28 is displayed on the display unit of the camera 28 under the control of the display control unit 40. The user captures the next image by using the camera 28 for which the set value is set by the setting unit 48 while operating the camera 28 according to the operation information displayed on the display unit of the camera 28.

Accordingly, since the user can capture the image according to the same operation information as the operation information of the camera 28 in a case where the image of the scene coincident with the scene of the image to be captured next is captured in the past, the user can more reliably capture the image coincident with the preference of the user.

The imaging device 14 may not include information terminal such as the mobile information terminal 30, and may include only the camera 28. In this case, the second transmission unit 50 and the second reception unit 52 are further provided in the camera 28.

An operation in a case where the imaging device 14 includes only the camera 28 is the same as the operation in a case where the imaging device 14 includes the camera 28 and the mobile information terminal 30 except that the transmission and reception of data are not performed and received between the camera 28 and the mobile information terminal 30 by the communication function.

In a case where the imaging device 14 includes only the camera 28, the set value of the camera 28, the message for causing the user to select whether or not to set the set value for the camera 28, the operation information of the camera 28, and the like are displayed on the display unit 42 of the camera 28 under the control of the display control unit 40 of the camera 28.

On the other hand, in a case where the imaging device 14 includes the camera 28 and the mobile information terminal 30, the set value of the camera 28, the message for causing the user to select whether or not to set the set value for the camera 28, the operation information of the camera 28, and the like may be displayed on the display unit 42 of the camera 28.

Alternatively, a display unit and a display control unit may be further provided in the mobile information terminal 30, and the set value of the camera 28, the message for causing the user to select whether or not to set the set value for the camera 28, the operation information of the camera 28, and the like may be displayed on the display unit of the mobile information terminal 30 under the control of the display control unit of the mobile information terminal 30. In this case, the user can also confirm the set value of the camera 28 in a case where the image coincident with the preference of the user is captured on the display unit of the mobile information terminal 30, and can unknowingly recognize the image preference of the user. Thus, the set value can be utilized in a case where an image next is captured.

The scene recognition unit 36 may be included in the imaging device 14 or may be included in the server 12. The scene recognition unit 36 may be provided in the camera 28 or the mobile information terminal 30.

In a case where the mobile information terminal 30 includes the scene recognition unit 36, the image is transmitted from the camera 28 to the mobile information terminal 30, the image is analyzed by the scene recognition unit 36 for each image in the mobile information terminal 30, and the scene of the image is recognized.

In a case where the server 12 includes the scene recognition unit 36, the image is transmitted from the imaging device 14 to the server 12, the image is analyzed by the scene recognition unit 36 for each image in the server 12, and the scene of this image is recognized.

The imaging system 10 may not include the server 12, and may include only the imaging device 14. In this case, the imaging device 14 further includes the image decision unit 20, the set value extraction unit 22, and the table creation unit 24.

An operation in a case where the imaging system 10 includes only the imaging device 14 is the same as the operation in a case where the imaging system 10 includes the imaging device 14 and the server 12 except that the transmission and reception of data are not performed between the imaging device 14 and the server 12.

In the apparatus according to the embodiment of the present invention, for example, a hardware configuration of a processing unit that executes various tasks of processing of the first reception unit 18, the image decision unit 20, the set value extraction unit 22, the table creation unit 24, the first transmission unit 26, the input unit 32, the imaging unit 34, the scene recognition unit 36, the reproduction information acquisition unit 38, the display control unit 40, the set value selection unit 46, the setting unit 48, the second transmission unit 50, the second reception unit 52, and the like may be dedicated hardware, or may be various processors or computers that execute programs.

Various processors include a central processing unit (CPU) which is a general-purpose processor that functions as various processing units by executing software (program), a programmable logic device (PLD), which is a processor capable of changing a circuit configuration after manufacture, such as a field programmable gate array (FPGA), and a dedicated electric circuit, which is a processor having a circuit configuration specifically designed in order to perform specific processing such as an application specific integrated circuit (ASIC).

One processing unit may be constituted by one of these various processors, or may be constituted by a combination of two or more processors of the same type or different types, for example, a combination of a plurality of FPGAs or a combination of a CPU and an FPGA. The plurality of processing units may be constituted by one of the various processors or may be constituted by using one processor obtained by combining two or more of the plurality of processing units.

For example, one processor is constituted by a combination of one or more CPUs and software as represented by computers such as servers and clients, and this processor functions as the plurality of processing units. A processor that realizes the functions of the entire system including the plurality of processing units via one integrated circuit (IC) chip is used as represented by a system on chip (SoC).

A hardware configuration of these various processors is an electric circuitry in which circuit elements such as semiconductor elements are combined.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: imaging system
12: server
14: imaging device
16: network
18: first reception unit
20: image decision unit
22: set value extraction unit
24: table creation unit
26: first transmission unit
28: camera
30: mobile information terminal
32: input unit
34: imaging unit
36: scene recognition unit
38: reproduction information acquisition unit
40: display control unit
42: display unit
44: table storage unit
46: set value selection unit
48: setting unit
50: second transmission unit
52: second reception unit

What is claimed is:

1. An imaging system comprising:
an imaging device that captures images, and displays the images on a display; and
a processor,
wherein the processor
analyzes the images to recognize scenes of the images,
acquires imaging information regarding a capturing in a case where an image is captured,
acquires reproduction information including at least one of a reproduction time and a number of times of reproduction, in a case where the image is reproduced on the display after the capturing of the image,
decides a second image coincident with preference of a user of the imaging device based on the reproduction information, from among first images having a same scene in the images, for each scene,
creates a preference parameter table in which the each scene and first imaging information in a case where the second image coincident with the preference of the user is captured are stored in association with each other for the each scene,
selects second imaging information associated with a scene coincident with a scene of third image to be captured next by the user from the preference parameter table, and
captures the third image by using the second imaging information selected by the processor.

2. The imaging system according to claim 1,
wherein the reproduction information includes the reproduction time in a case where the image is reproduced on the display of the imaging device, and
the processor decides a fourth image of which the reproduction time is the longest as the second image coincident with the preference of the user, from among the first images having the same scene.

3. The imaging system according to claim 1,
wherein the reproduction information includes the number of times of reproduction in a case where the image is reproduced on the display of the imaging device, and
the processor decides a fifth image for which the number of times of reproduction is the largest as the second image coincident with the preference of the user, from among the first images having the same scene.

4. The imaging system according to claim 1,
wherein the reproduction information includes the reproduction time and the number of times of reproduction in a case where the image is reproduced on the display of the imaging device, and
the processor decides the second image coincident with the preference of the user based on a result obtained by weighting and adding the reproduction time and the number of times of reproduction, from among the first images having the same scene.

5. The imaging system according to claim 1,
wherein the imaging information includes a set value regarding the capturing of the imaging device in a case where the image is captured, and
the processor
sets the set value for the imaging device, and
captures the third image by using the set value set by the processor.

6. The imaging system according to claim 5,
wherein the imaging information further includes operation information of the imaging device by the user in a case where the image is captured, and
the processor displays the operation information of the imaging device on the display of the imaging device.

7. The imaging system according to claim 6,
wherein the imaging device includes a camera,
the camera includes a first display as the display, and a first processor as the processor, and the first processor of the camera displays first operation information of the camera as the operation information on the first display of the camera.

8. The imaging system according to claim 7, wherein the first processor of the camera displays a message for causing the user to select whether or not to set the set value for the camera on the first display of the camera.

9. The imaging system according to claim 8, wherein the first processor of the camera further displays the first operation information of the camera on the first display of the camera in a case where the user captures the next third image.

10. The imaging system according to claim 6, wherein the imaging device includes a camera having a first communication function, and an information terminal having a second communication function,
the camera and the information terminal are able to be connected to each other by the first communication function and the second communication function,
the information terminal includes a second display as the display and a second processor as the processor, and
the second processor of the information terminal displays a first operation information of the camera as the operation information on the second display of the information terminal.

11. The imaging system according to claim 10, wherein the second processor of the information terminal displays a message for causing the user to select whether or not to set the set value for the camera on the second display of the information terminal.

12. The imaging system according to claim 11, wherein the second processor of the information terminal displays the first operation information of the camera on the second display of the information terminal in a case where the user captures the next third image.

13. The imaging system according to claim 7, wherein the first operation information of the camera includes information indicating whether an orientation of the camera is a portrait orientation or a landscape orientation in a case where the image is captured, information indicating an inclination of the camera from a horizontal state, and information indicating an on or off state of a member of the camera.

14. The imaging system according to claim 5, wherein the processor automatically sets the set value for the imaging device without causing the user to select whether or not to set the set value for the imaging device.

15. The imaging system according to claim 1, wherein the scenes includes first scenes of a plurality of different weather, and
the processor decides the second image coincident with the preference of the user based on the reproduction information, from among sixth images having scenes of a same weather in the images, for each first scene of the weather.

16. The imaging system according to claim 1, wherein the scenes includes second scenes in a plurality of different time slots, and
the processor decides the second image coincident with the preference of the user based on the reproduction information, from among seventh images having scenes in a same time slot in the images, for each second scene in the time slot.

17. The imaging system according to claim 1, wherein the scenes includes third scenes in which a subject moves in a plurality of different moving speed bands, and
the processor decides the second image coincident with the preference of the user based on the reproduction information, from among eighth images having scenes in a same moving speed band in the images, for each third scene in the moving speed band.

18. The imaging system according to claim 1, wherein the scenes includes fourth scenes of orientations of the image including a portrait orientation and a landscape orientation, and
the processor decides the second image coincident with the preference of the user based on the reproduction information, from among ninth images having scenes in a same orientation of the image in the image, for each fourth scene in the orientation of the image.

19. The imaging system according to claim 1, further comprising:
a server connected to the imaging device via a network, wherein the imaging device includes a first processor as the processor,
the server includes a second processor as the processor,
the first processor
analyzes the images to recognize the scenes of the images,
acquires the imaging information regarding the capturing in a case where the image is captured,
acquires the reproduction information in a case where the image is reproduced on the display after the capturing of the image, and
transmits the image, the scene, the imaging information, and the reproduction information to the server,
the second processor
receives the image, the scene, the imaging information, and the reproduction information from the imaging device,
decides the second image coincident with the preference of the user based on the reproduction information, from among the first images having the same scene, for each scene,
creates the preference parameter table in which the each scene and the first imaging information in a case where the second image coincident with the preference of the user is captured are stored in association with each other for the each scene, and
transmits the preference parameter table to the imaging device, and
the first processor further receives the preference parameter table from the server.

20. The imaging system according to claim 1, further comprising:
a server connected to the imaging device via a network,
wherein the imaging device includes the processor,
the server includes a second processor,
the processor
acquires the imaging information regarding the capturing in a case where the image is captured,
acquires the reproduction information in a case where the image is reproduced on the display after the capturing of the image,
transmits the image, the imaging information, and the reproduction information to the server,
the second processor
receives the image, the imaging information, and the reproduction information from the imaging device,
analyzes the image received by the second processor to recognize the scene of the image, decides the second image coincident with the preference of the user based on the reproduction information, from among the first images having the same scene, for each scene, creates the preference parameter table in which the each scene and the first imaging information in a case where the second image coincident with the preference of the user is captured are stored in association with each other for the each scene, and transmits the preference parameter table to the imaging device, and the processor further receives the preference parameter table from the server.

21. The imaging system according to claim 1, wherein the imaging device includes the display and the processor.

22. A server comprising:

a processor, wherein the processor receives from an imaging device an image, a scene of the image, imaging information regarding capturing in a case where the image is captured, and reproduction information including at least one of a reproduction time and a number of times of reproduction, in a case where the image is reproduced in the imaging device after the capturing of the image, decides a second image coincident with preference of a user of the imaging device based on the reproduction information, from among first images having a same scene in the images, for each scene, creates a preference parameter table in which the each scene and first imaging information in a case where the second image coincident with the preference of the user is captured are associated with each other for the each scene, and transmits the preference parameter table to the imaging device.

23. An imaging device that captures images, and displays the images on a display, the imaging device comprising:

a processor, wherein the processor analyzes the images to recognize scenes of the images, acquires imaging information regarding a capturing in a case where an image is captured, acquires reproduction information including at least one of a reproduction time and a number of times of reproduction, in a case where the image is reproduced on the display after the capturing of the image, transmits the image, the scene, the imaging information, and the reproduction information to a server, decides a second image coincident with preference of a user of the imaging device based on the reproduction information, from among first images having a same scene in the images, for each scene, and receives a preference parameter table created such that the each scene and first imaging information in a case where the second image coincident with the preference of the user is captured are associated with each other for the each scene from the server, selects second imaging information associated with a scene coincident with a scene of a third image to be captured next by the user from the preference parameter table, and captures the third image by using the second imaging information selected by the processor.

24. An imaging method comprising:

analyzing, by a processor, images captured by the processor to recognize scenes of the images;

acquiring, by the processor, imaging information regarding a capturing in a case where an image is captured;

acquiring, by the processor, reproduction information including at least one of a reproduction time and a number of times of reproduction, in a case where the image is reproduced on a display of an imaging device after the capturing of the image;

deciding, by the processor, a second image coincident with preference of a user of the imaging device based on the reproduction information, from among first images having a same scene in the images, for each scene;

creating, by the processor, a preference parameter table in which the each scene and first imaging information in a case where the second image coincident with the preference of the user is captured are stored in association with each other for the each scene;

selecting, by the processor, imaging information associated with a scene coincident with a scene of an image to be captured next by the user from the preference parameter table; and capturing, by the processor, an image by using the imaging information selected in a step of selecting the imaging information.

25. A non-transitory computer-readable recording medium having a program causing a computer to execute the steps of the imaging method according to claim 24 recorded thereon.

* * * * *